Oct. 4, 1932.                A. R. LE MOON                1,881,408
VEHICLE DRIVE WHEEL AXLE UNIT MOUNTING
Filed April 9, 1928
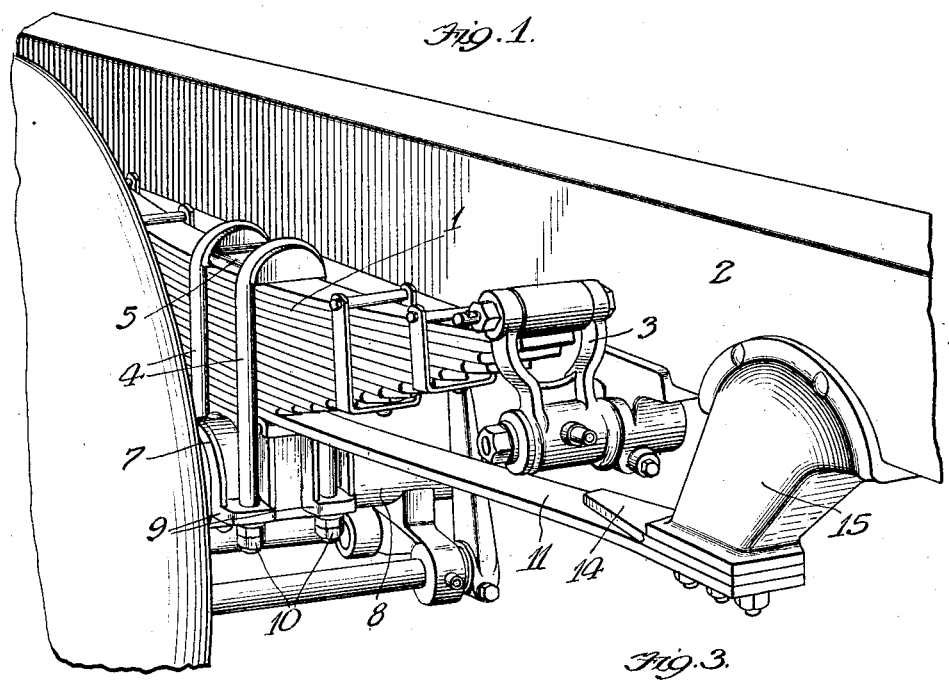
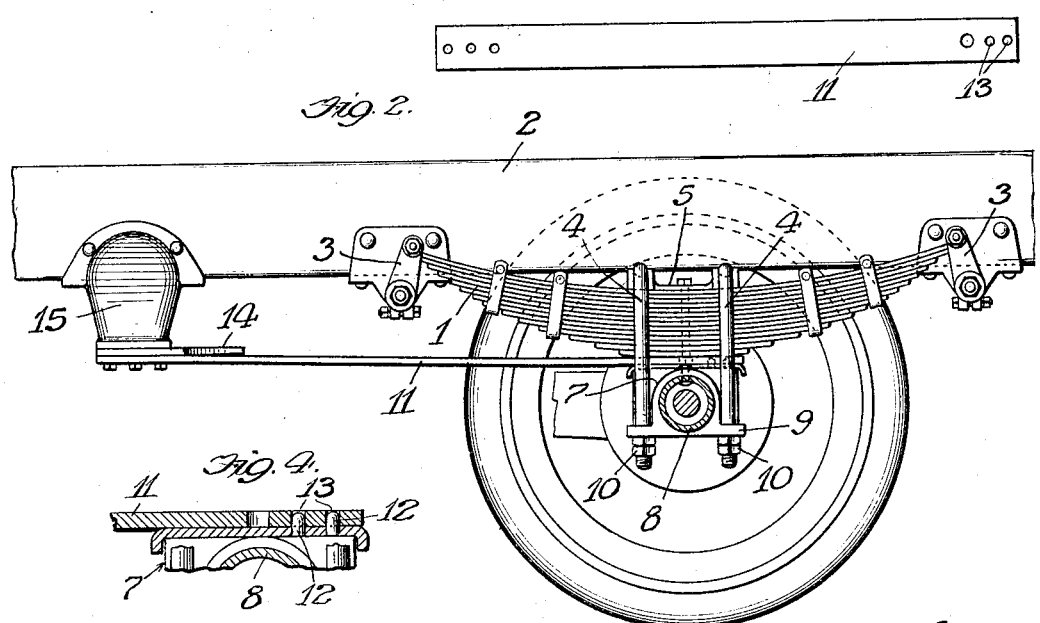
Witness
Martin H. Olsen
Inventor
Axel R. Le Moon
By Rummler & Rummler
Attys.

Patented Oct. 4, 1932

1,881,408

UNITED STATES PATENT OFFICE

AXEL R. LeMOON, OF CHICAGO, ILLINOIS

VEHICLE DRIVE WHEEL AXLE UNIT MOUNTING

Application filed April 9, 1928. Serial No. 268,578.

This invention relates to a combined spring radius member mounting of the axle housing for the drive wheels of a vehicle. The purpose of the invention is to simplify such constructions and to avoid the use of bearing joints in the radius member or other wearing parts which may reduce the life of the mechanism.

The objects of the invention are accomplished by means of a construction as shown in the drawing in which:

Figure 1 is a perspective view of the improved mounting for the axle housing and shows part of the machine frame.

Fig. 2 shows the construction in side elevation.

Fig. 3 is a plan of a radius member.

Fig. 4 is a sectional detail of the radius member mounting.

The improvement to which this invention relates consists in the provision of a horizontally disposed resilient radius member extending from the bottom of the spring forwardly to a bracket mounted upon the machine frame and to which the end of the radius member is secured. This member is substantially a part of the spring unit and consists of an extra heavy leaf clamped between the spring and a casting secured to the axle housing.

As shown in the drawing, a semi-elliptical spring 1 is connected at its ends to the machine frame 2 by the customary shackle arrangement 3. At its center, the spring is clamped to the axle housing by the U-bolts 4 passing over a cap 5 on the upper surface of the spring and through the flanges 9 of a casting 7 secured to the axle housing 8. The U-bolts are drawn toward casting 7 by the nuts 10. The casting 7 is formed to receive the radius element 11 between it and the bottom leaf of spring 1. Dowels 12 prevent the radius member from shifting by extending through apertures 13 in the radius member and into similar apertures in casting 7. The forward end of the radius member 11 is reinforced by a short leaf 14 and the radius member and this leaf are securely bolted to bracket 15 extending from frame 2.

The radius member serves to maintain the proper relationship between the drive unit and the machine frame and it is important that it normally lie in a horizontal plane so that when the wheels move upwardly or downwardly with respect to the frame 2 there will be a minimum of forward movement of the axle unit as it moves through an arc around the casting 15. The resilient leaf 11 may twist as required when one wheel moves higher or lower than the other.

In the operation of the construction, as the wheels move up or down against the action of spring 1, they are maintained in substantially fixed relationship with the center of movement of the radius member 11 at bracket 15. It is the function of the radius member 11 to maintain this fixed relationship without the use of wearing joints as would be required if the radius member were normally inclined as is often the case.

Although but one specific embodiment of this invention has been herein shown and described, it will be understood that details of the construction shown may be altered or omitted without departing from the spirit of this invention as defined by the following claims:

I claim:

1. In combination with a vehicle frame, a pair of spring shackles pivoted to the frame and spaced apart longitudinally thereof, a semi-elliptical leaf spring with its ends pivoted to said shackles, a drive wheel axle unit, said axle unit extending crosswise beneath the center of said spring, a second normally straight horizontal leaf spring with one end thereof located between said semi-elliptical spring and said axle unit, means for rigidly clamping both of said springs and axle unit together, a bracket extending from said frame, and means for rigidly securing the opposite end of said straight horizontal spring to said bracket.

2. In combination with a vehicle frame, a pair of spring shackles pivoted to the frame and spaced apart longitudinally thereof, a semi-elliptical leaf spring with its ends pivoted to said shackles, drive wheels and a supporting axle unit therefor, said axle unit extending beneath the center of said spring at right angles thereto, a normally straight horizontal cantilever leaf spring brace clamped to said semi-elliptical leaf spring and extending beyond the end of said semi-elliptical leaf spring, and means for rigidly securing the end of said straight horizontal leaf spring to the vehicle frame.

Signed at Chicago this 6th day of April 1928.

AXEL R. LeMOON.